United States Patent
Landry et al.

(10) Patent No.: US 7,151,575 B1
(45) Date of Patent: Dec. 19, 2006

(54) WIRELESS EXTENSION FOR CABLE TELEVISION SIGNALS

(75) Inventors: Michael William Landry, San Diego, CA (US); Itzhak Gurantz, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 503 days.

(21) Appl. No.: 10/621,884

(22) Filed: Jul. 17, 2003

Related U.S. Application Data (60) Provisional application No. 60/397,056, filed on Jul. 18, 2002.

(51) Int. Cl.
*H04N 5/38* (2006.01)
*H04N 7/18* (2006.01)

(52) U.S. Cl. .......................... 348/723; 725/81; 725/78

(58) Field of Classification Search ................ 348/723, 348/724, 725; 725/81, 82, 78, 85
See application file for complete search history.

(56) References Cited

U.S. PATENT DOCUMENTS

| | | | |
|---|---|---|---|
| 5,682,195 A | * 10/1997 | Hendricks et al. | 725/31 |
| 6,263,503 B1 | * 7/2001 | Margulis | 725/81 |
| 2002/0038459 A1 | * 3/2002 | Talmola et al. | 725/81 |

* cited by examiner

*Primary Examiner*—Michael H. Lee
(74) *Attorney, Agent, or Firm*—Michael W. Landry (57) ABSTRACT

A wireless link provides an extension to cable television signals for a television receiver that does not have access to a coaxial cable. Analog and digital cable channels are processed and transmitted over the wireless link. Security of the signal is provided by transmitting encrypted data and decrypting at the receiving node. The conditional access encryption inherent in the data can insure communication security or encryption may be performed at the transmitting node.

5 Claims, 9 Drawing Sheets

Prior Art

WIRELESS EXTENSION FOR CABLE TELEVISION SIGNALS

RELATED APPLICATIONS

This application claims priority from United States provisional patent application entitled "Wireless extension to coaxial television signal" Ser. No. 60/397,056 filed Jul. 18, 2002.

BACKGROUND

1. Field of the Invention

The present invention relates to transmitting analog and digital television signals over a wireless link.

2. Prior Art

Coaxial cable has a large signal bandwidth enabling transmission of many channels, which allows cable television service providers to offer a broad range of programming to subscribers. Many cable television systems offer analog TV channels and digital TV channels. Analog channels are occupied with programming of established over the air stations, programming supported by advertising, or programming desired by most subscribers. Some premium services are offered on analog channels that use scrambling or blocking to unauthorized users. Digital channels offer better utilization of the frequency spectrum, potentially higher quality images, and robust security against unauthorized reception. Many premium services are transmitted on digital channels. Digital programming is commonly transmitted using Motion Picture Experts Group (MPEG) encoding and formatting. The bit rate of an MPEG encoded video signal may be approximately 1.5 Mbits/S to 15 Mbits/S and generally includes a digital audio signal. An in-home receiving system must support reception of both analog and digital channels from the cable system.

Wiring must be installed in homes and each television must be connected to the cable to receive the cable system signal. Installing wiring in an existing structure when adding new television receivers or moving their location presents a cost burden and inconvenience to the user.

Figure 1:
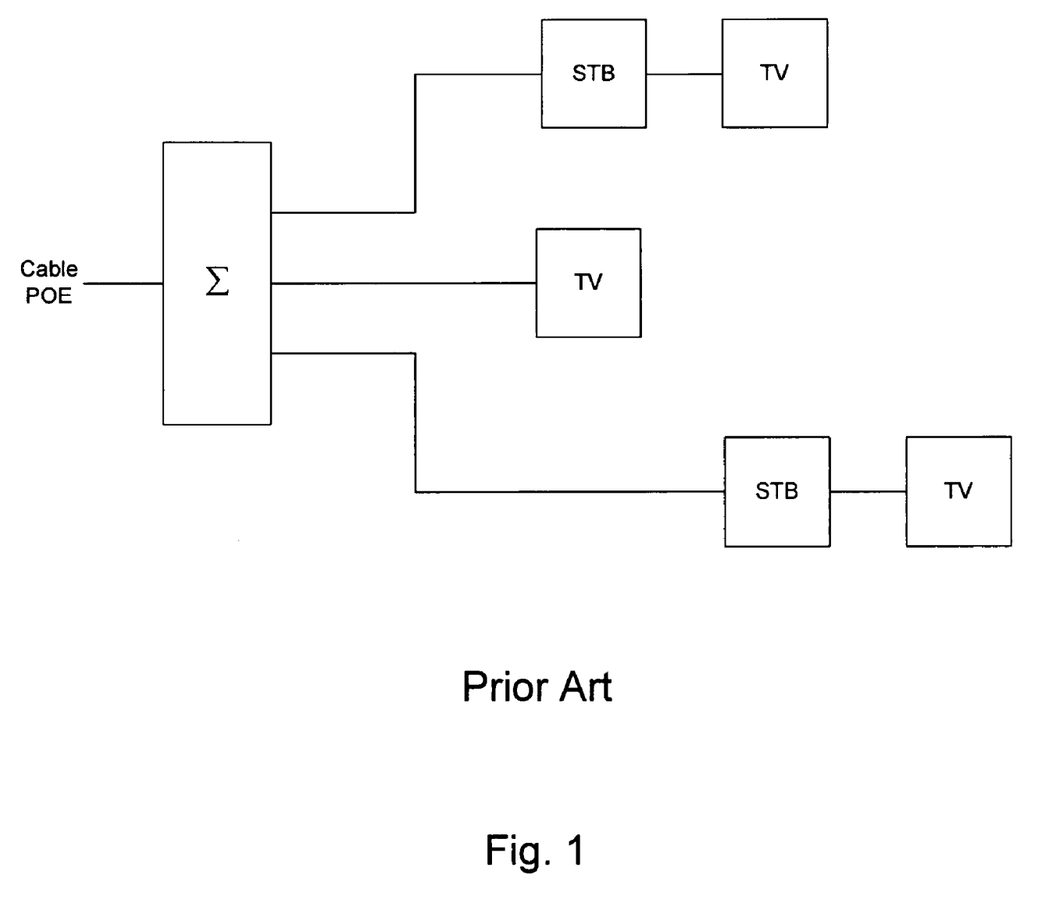
FIG. 1 is a diagram of a prior art cable wiring configuration.

FIG. 1 shows a typical wiring configuration of a home wired with coaxial cable. The cable signal enters the home at a point of entry (POE). A splitter divides the signal power and drives coaxial cables run to each room. A set top box may be used to convert the signal, or the cable may be connected directly to a cable ready television receiver. A coaxial cable must be run to each room where a television is used.

U.S. Pat. No. 5,936,660 by Gurantz entitled "Digital Video Converter Box for Subscriber/Home with Multiple Television Sets", incorporated herein by reference, discloses a distribution technique for digital video programming to multiple television receivers. This reference includes a suggestion of a wireless RF link to transmit the video program to the television. This reference does not address the need to distribute both analog and digital video programming in the home. This reference discloses the use of a single chassis containing conditional access for all televisions and eliminates set-top converter boxes at each television. Authorization of each television signal is done at the central distribution point before transmission to the television set. The focus of the reference is primarily for distribution over cable and does not address the need for secure transmission over the wireless RF link.

It is desirable to overcome the cable wiring difficulty to enable the analog and digital programming available from the cable service to be sent to any television receiver in the home.

SUMMARY OF THE INVENTION

A wireless connection is created between a coaxial cable outlet and a television receiver at a remote location. In a sending unit, a tuner responsive to a remote control interface selects an RF channel for reception. The RF channel may be an analog TV channel with a single program or a digital channel that comprises several programs. The sending unit comprises two signal processing paths to enable selection of either channel type. A digital demodulator and MPEG demultiplexer extract one or more MPEG programs from a digital channel MPEG stream. An MPEG encoder converts an analog channel to an MPEG program. A selector applies the MPEG program from one of the two paths to a modulator and transmitter. A wireless link transmits the MPEG information. At the remote location, a receiving unit converts the transmitted signal to an MPEG stream and an MPEG decoder produces a signal to drive a television set. A remote control uses an IR or RF wireless command link to select the channel tuned. The device may include conditional access to enable receiving protected programming. Conditional access information is transmitted over the wireless link, if needed. Frequency selection, power control, device identification, and network identification is used to maintain privacy and avoid interference between links operating within range of each other.

The wireless link may operate using a custom protocol or may be used with a wireless network standard such as IEEE-802.11. While MPEG encoding is used as an example, other digital video encoding techniques can be used with the invention.

In one embodiment, conditional access incorporated into the cable programming provides the security for the wireless link. In another embodiment, encryption is added by the transmitting node to insure link security. The conditional access information is transmitted over the link to the receiver.

DETAILED DESCRIPTION OF THE INVENTION

Figure 2:
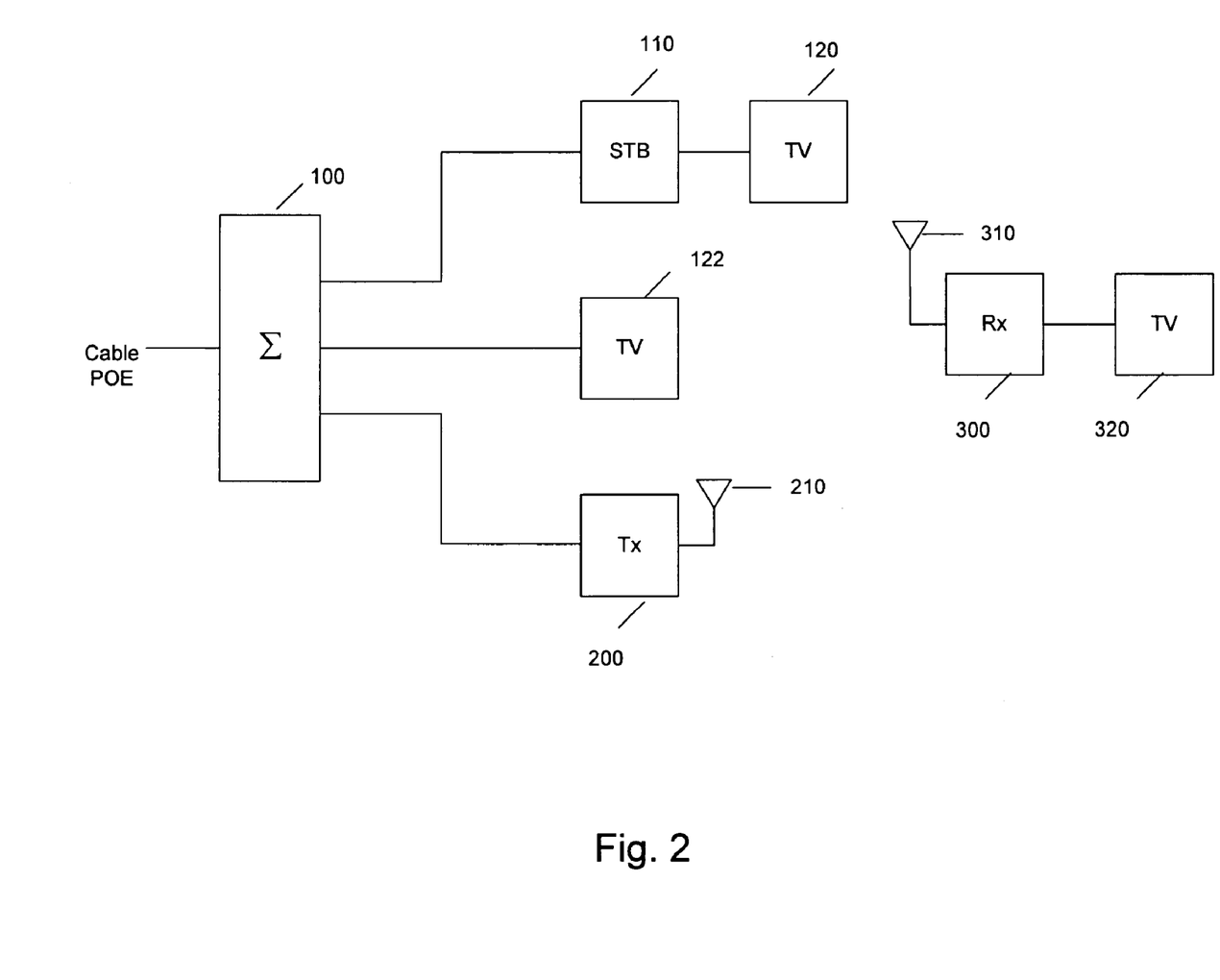
FIG. 2 is a diagram of a cable wiring configuration using a wireless extension to a cable outlet in accordance with the present invention.

Referring to FIG. 2, splitter 100 divides power among several cables, which are connected to set top boxes (STB) 110 or directly to televisions 122. STB 110 tunes a channel and delivers a signal to television 120. Wireless link sending unit 200 receives the cable signal, tunes a specific channel and transmits digital information using transmitting antenna 210. Receiving antenna 310 receives the signal, receiver 300 tunes and decodes the link signal, and supplies a signal to television 320.

Figure 3:
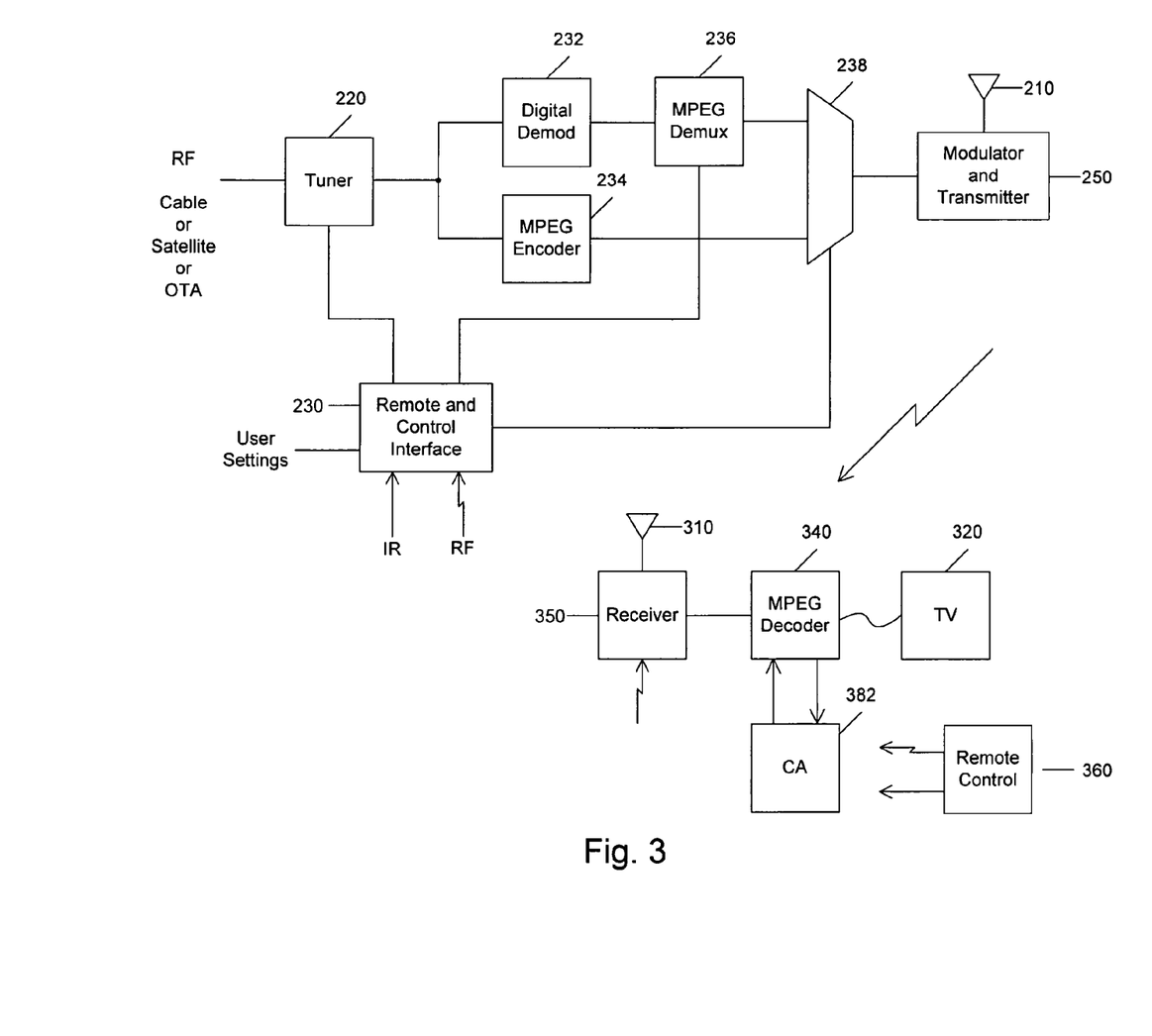
FIG. 3 is a block diagram a wireless link in accordance with the present invention.

Referring to FIG. 3, tuner(s) 220 preselects, amplifies, and down converts one or more cable channels, typically 6 MHz wide each. The tuning process performed by tuner 220 is substantially the same for analog and digital channels; the channel tuned can be an analog channel or a digital channel. The tuner output can be at an intermediate frequency (IF) or baseband. Alternatively, two separate tuners can be used, one optimized for analog channels and one optimized for digital channels. Digital demodulator 232 processes the tuner output signal if the channel is a digital signal. MPEG encoder 234, which includes a video decoder, processes the signal if the tuner output is an analog channel and creates a digital MPEG signal. Both signal processing paths can attempt to process the signal. Digital demodulator 232 outputs an MPEG multiplex data stream to MPEG demultiplexer 236 that selects one or more programs from the stream. Under control of control unit 230, data selector 238 routes one of the signal path digital data streams to modulator and transmitter 250. Modulator/transmitter 250 contains a digital modulator, up converter, and power amplifier to drive transmitting antenna 210 with an RF signal. Tuner 220 can tune more than one channel and MPEG demux 236 can select more than one program.

Remote control interface and control unit 230 is responsive to wireless remote control signal, preferably either an infrared (IR) or RF signal or both. Any common UHF remote control signal and protocol is suitable for this interface. Remote control interface contains logic to select an analog or digital signal processing path. Alternatively, it is possible to re-multiplex the output of the MPEG encoder with one or more of the MPEG demultiplexed channels from the digital tuned channel to form an MPEG stream. The determination of which channels are analog or digital can be based on a channel lineup programmed in the sending unit or by determining, using control logic circuitry, which signal processing path has detected a lock on the tuner output signal. A lock detector is an included function in a digital demodulator and an MPEG decoder encoder.

User settings including channel selection, power level, network and device identification, encryption keys, and other user selected parameters can be made through switches, remote control commands, or a data programming interface such as USB, RS-232, or Ethernet.

Receiving antenna 310 receives the wireless link signal and couples the signal to receiver 350, which amplifies, down converts, and demodulates the RF signal. A digital output signal is produced that drives MPEG demultiplexer/decoder 340. Conditional access (CA) unit 382 is used to decrypt any encrypted fields of the MPEG data to enable decoding. MPEG data can include embedded conditional access information to enable unlocking the signal or the CA information may be transmitted in other portions of the digital data stream. MPEG decoder 340 produces a video and audio signal suitable for display on a television receiver. The video and audio signal may be connected to the television as baseband signals or modulated to a standard TV channel frequency before coupling to the television.

Remote control 360 is preferably located near television 320 and is commanded by the user to select channels. The remote control signal is communicated to sending unit remote interface 230.

Wireless link access is limited, since the conditional access is in the receiving unit. This provides security to prevent unauthorized receiving units from accessing the program data.

Figure 4:
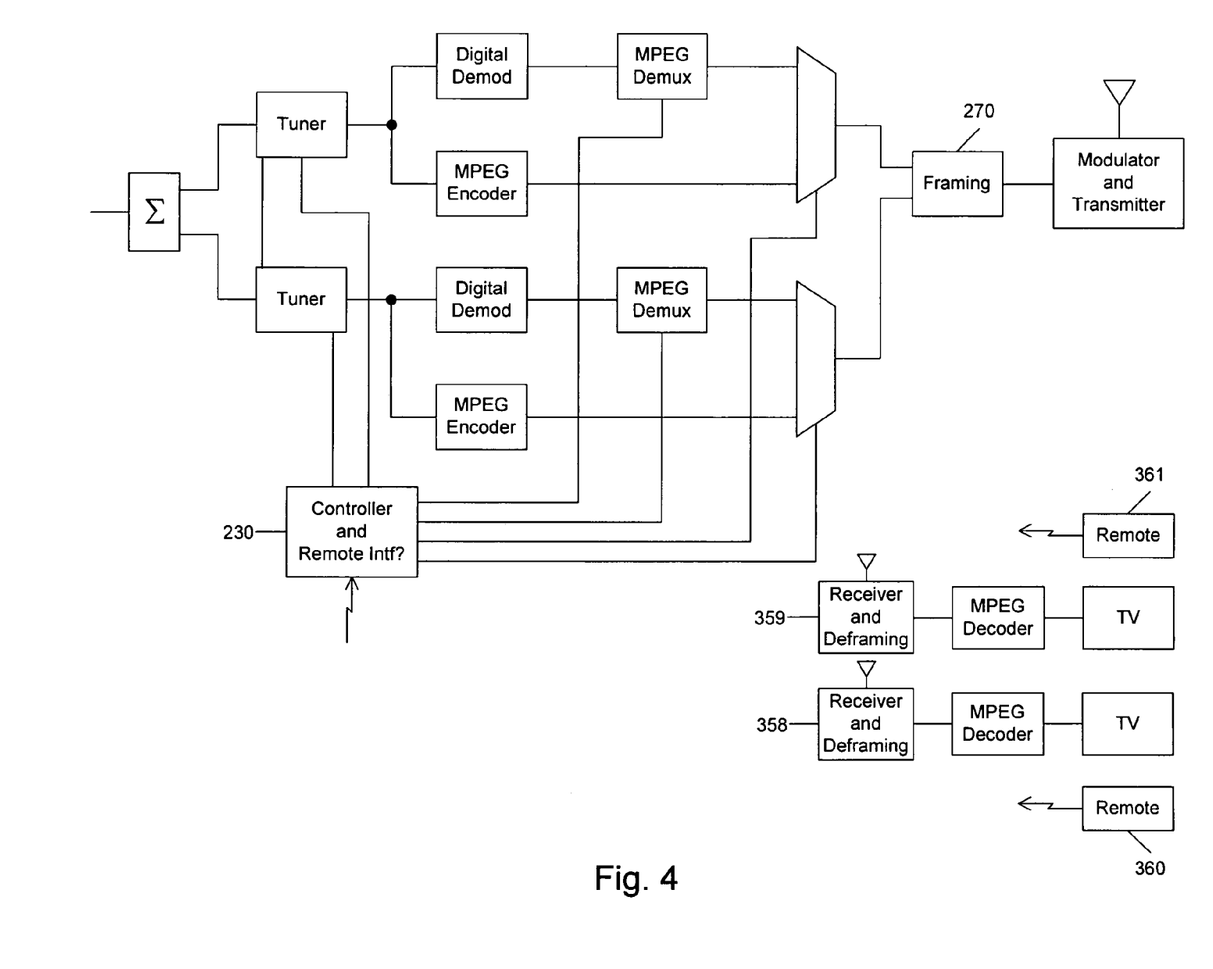
FIG. 4 is a block diagram of a wireless link using multiple tuners and receivers according to the present invention.

FIG. 4 shows an embodiment of the invention using multiple tuners in the sending unit. This allows one cable drop connection to connect to the sending unit and extract multiple channels for transmission over the wireless link. Framing 270 combines the several streams of digital data and adds frame formatting, which includes address information that allows receiving units 358 and 359 to select the proper signal. Remote control interface receives 230 receives a signal from either remote controls 360 or 361. This configuration allows transmitting several signals over the link, each independent signal containing addressing to determine which of several receiving units decode the signals. Two or more tuner and signal processing paths may be included in a sending unit. The remote control units can operate on different UHF frequencies or the same frequency with an occasional collision in signals. A remote control identifier is sent with the remote control data to insure that the correct remote control signal is controls the proper respective tuner.

Figure 5:
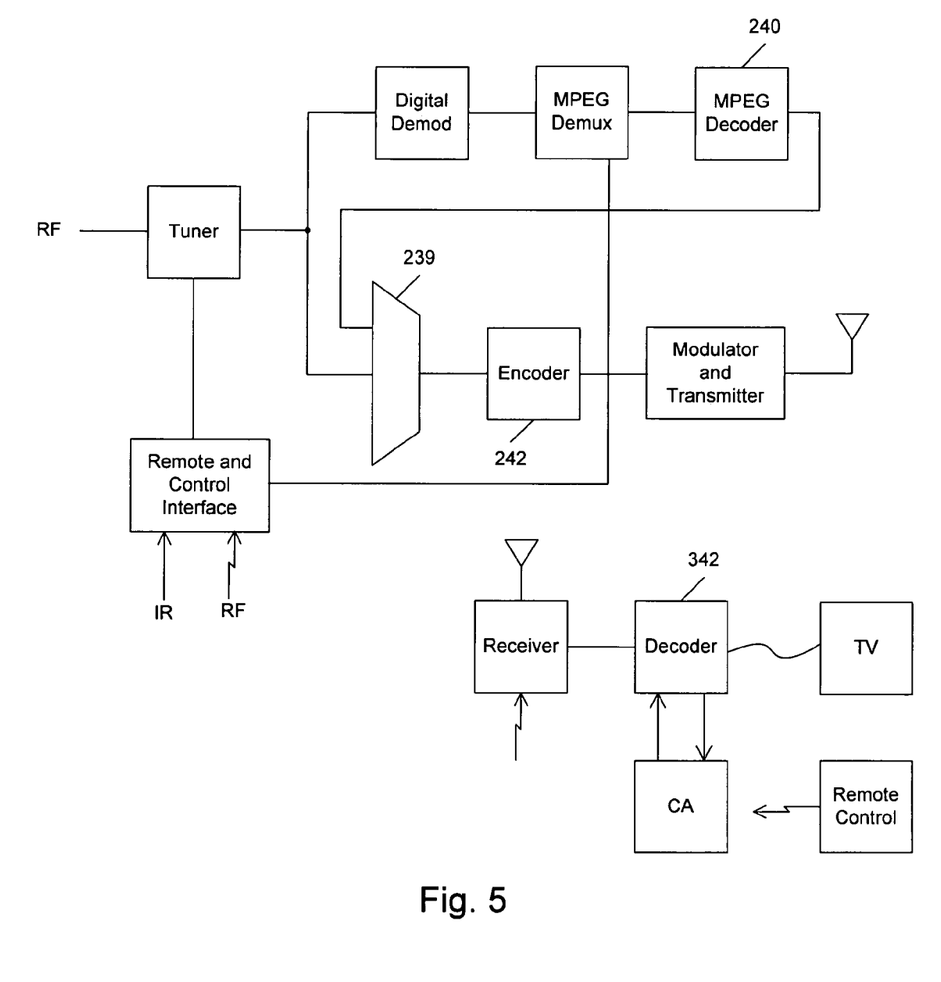
FIG. 5 is a block diagram of an alternate embodiment of a wireless link that recodes the signal from both digital and analog channels.

FIG. 5 shows an embodiment of the invention using an alternate encoding technique for the video signal. MPEG decoder 240 converts the demultiplexed MPEG stream to an analog signal. Signal selector 239 routes the selected analog or decoded digital signal to encoder 242, which outputs a digital signal to the modulator and transmitter. The alternate encoding technique is useful when the wireless link is optimally utilized with a data rate different from that offered by the MPEG encoding. The link may have more or less available bandwidth than required by an MPEG encoded signal, thus an alternate coding may be used. The wireless link may be restricted in bandwidth and another video compression technique is needed, such as Wavelet transform encoding. An example Wavelet compression device is an Analog Devices Inc. ADV601 video codec. Wavelet transform compression can achieve a high compression ratio with good image quality. Decoder 342 is the complementary video decoder that converts the encoded signal to a signal suitable for driving the television.

Figure 6:
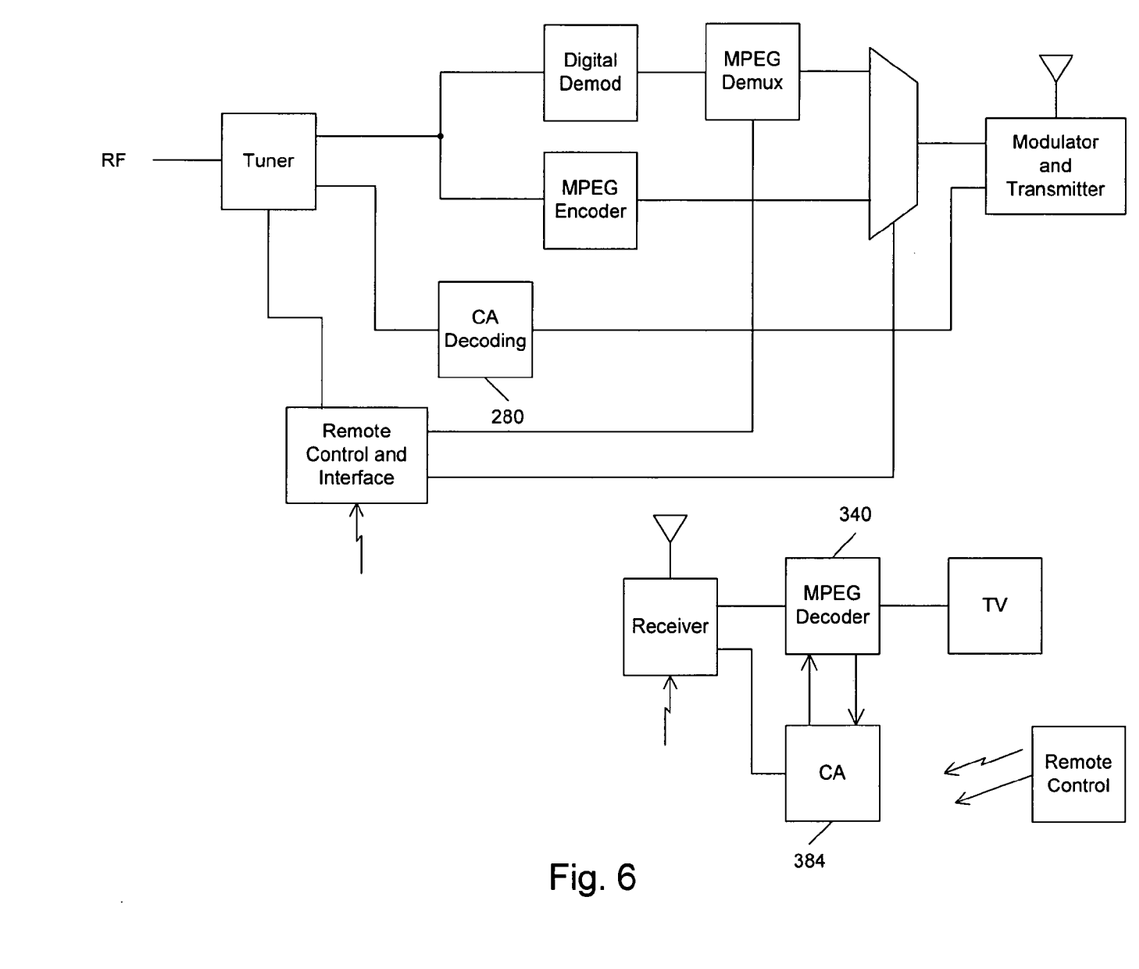
FIG. 6 is a block diagram of an alternate embodiment of a wireless link where conditional access is decoded in the sending unit and transmitted as a parallel channel to the receiving unit.

FIG. 6 shows an alternative where the conditional access (CA) information is decoded from the tuner output by CA decoding 280. This is applicable when the CA signaling is transmitted out of band from the tuned channel or the data is not embedded in the MPEG stream. The CA information is combined with the digital video information to be transmitted over the wireless link. The receiving unit communicates the CA information to CA unit 384 to enable access to the video data.

Unauthorized devices are denied network access and are prevented from receiving information unless commanded from the network controller. In one embodiment, data is transmitted in the clear and the operation of the client device disables the receipt and processing of the restricted information if the address of the message indicates that it is not intended for the client. This provides a moderate level of security because the operation of the device is controlled by hardware and software functions that are not generally accessible to a user.

In order to have a higher level of security and prevent interception of the signal by unauthorized users, data can be transmitted with encryption that requires a decryption key in order to receive and process the data. In a key-based encryption system, both the sender and receiver must possess the same key, or keys derived from a common source. An unauthorized user would not possess the decryption key and would not have access to the data. A number of well known techniques for encrypting data and transmitting keys can be employed. The keys can be manually programmed into the sender and receiver or keys exchanged between units using well known public key algorithms. Encryption using private key techniques include CAST 128 bit, IDEA 128 bit, DES, Triple-DES 168 bit. Public key exchange techniques include Diffie-Hellman, ElGamal, RSA, and PGP. Encryption can also be performed by simple scrambling operation.

Encryption is discussed generally in Stinson, Douglas R., Cryptography Theory and Practice, CRC Press, Inc. 1995

The following documents, each of which is incorporated herein by reference, further disclose encryption techniques suitable for use with the present invention:

U.S. Pat. No. 4,200,770 Cryptographic Apparatus and Method, Hellman et al.

U.S. Pat. No. 4,218,582 Public Key Cryptographic Apparatus and Method, Hellman et al.

U.S. Pat. No. 5,299,263 Two-Way Public Key Authentication and Key Agreement for Low-cost Terminals, Beller et al.

U.S. Pat. No. 4,424,414 Exponentiation Cryptographic Apparatus And Method, Hellman et al.

U.S. Pat. No. 4,405,829 Cryptographic Communications System and Method, Rivest et al. (RSA)

Digital Signature Standard (DSS), Federal Information Processing Standards Publication 186-1, Dec. 15, 1998, National Technical Information Service, U.S. Department of Commerce, Springfield, Va. 22161. FIPS PUB 186-1.

Conditional access techniques are described in the following references; each is incorporated herein by reference: U.S. Pat. No. 6,292,568, Akins, III, et al., Representing entitlements to service in a conditional access system; U.S. Pat. No. 6,157,719, Wasilewski, et al., Conditional access system.

Conditional access information is transmitted in various ways from the cable head end to the home. Among the techniques for transmitting CA information are: a parallel out of band channel, in-band signaling using vertical blanking interval (VBI) or subcarriers, embedded in digital video information. When needed, the CA information is sent by the transmitting node of the link to the receiving node to be used by the CA unit for unlocking the signal.

Figure 7:
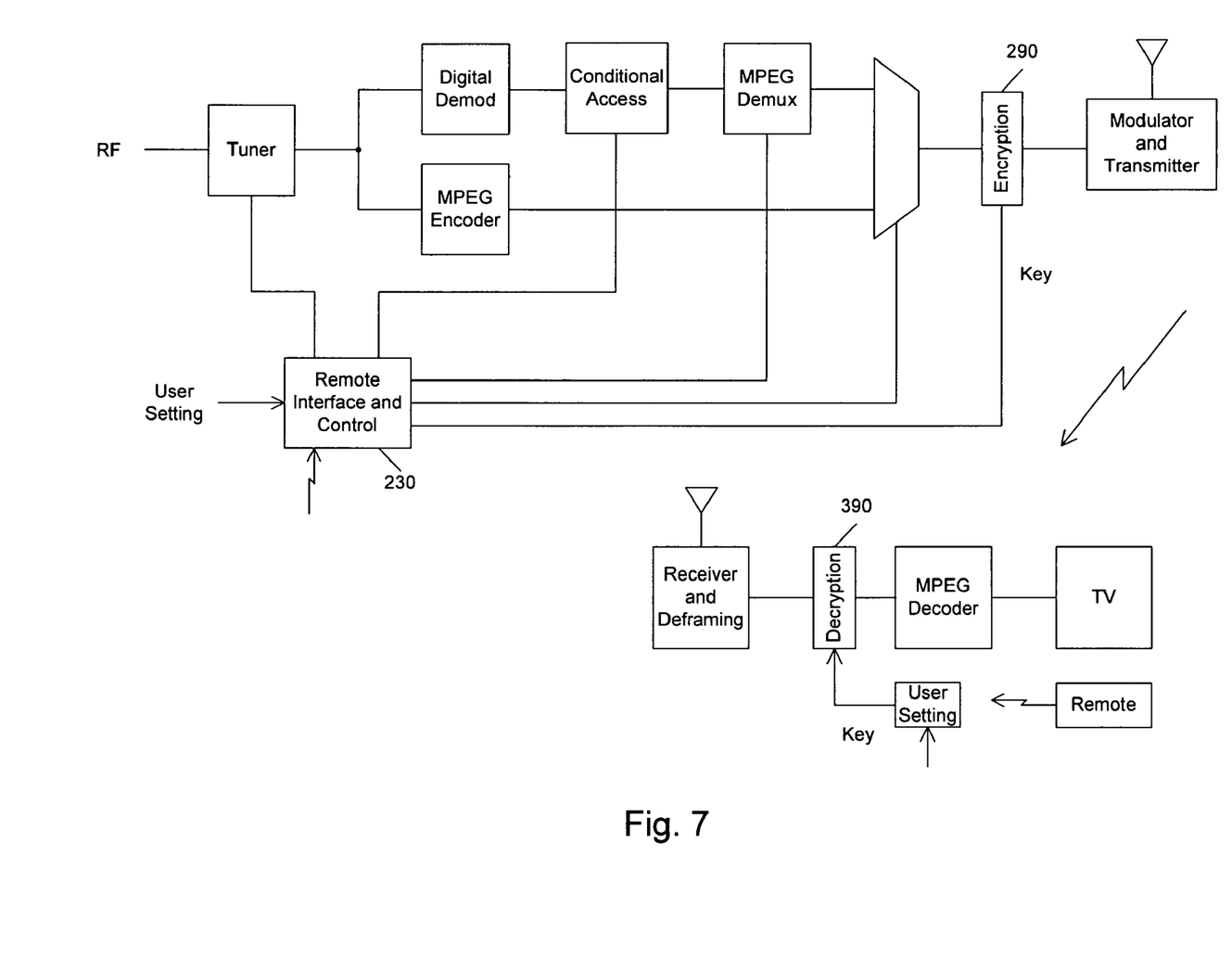
FIG. 7 is a block diagram of a wireless link that encrypts digital data transmitted over the wireless link.

FIG. 7 shows an alternative embodiment in which encryption is performed on the wireless link data in the sending unit and decryption is performed in the receiving unit. Encryption unit 290 performs encryption prior to transmitting the data. An encryption key is provided by the control unit, which receives the key or key selection information from a user setting interface.

The receiving unit can be programmed with a user selected unique key over the user settings interface of the sending unit. A corresponding key is programmed into the receiving unit over a user setting interface 391. The remote control can be used to load keys into the sending or receiving units.

Alternatively, a private key can be programmed into the receiving unit through user setting interface 391. A public key is computed in the receiving unit and transmitted to the sending unit to be used for encryption of the digital data. A wireless link communicating from the receiving unit to the sending unit would be employed for this purpose, which requires only a low data rate capability.

Figure 8:
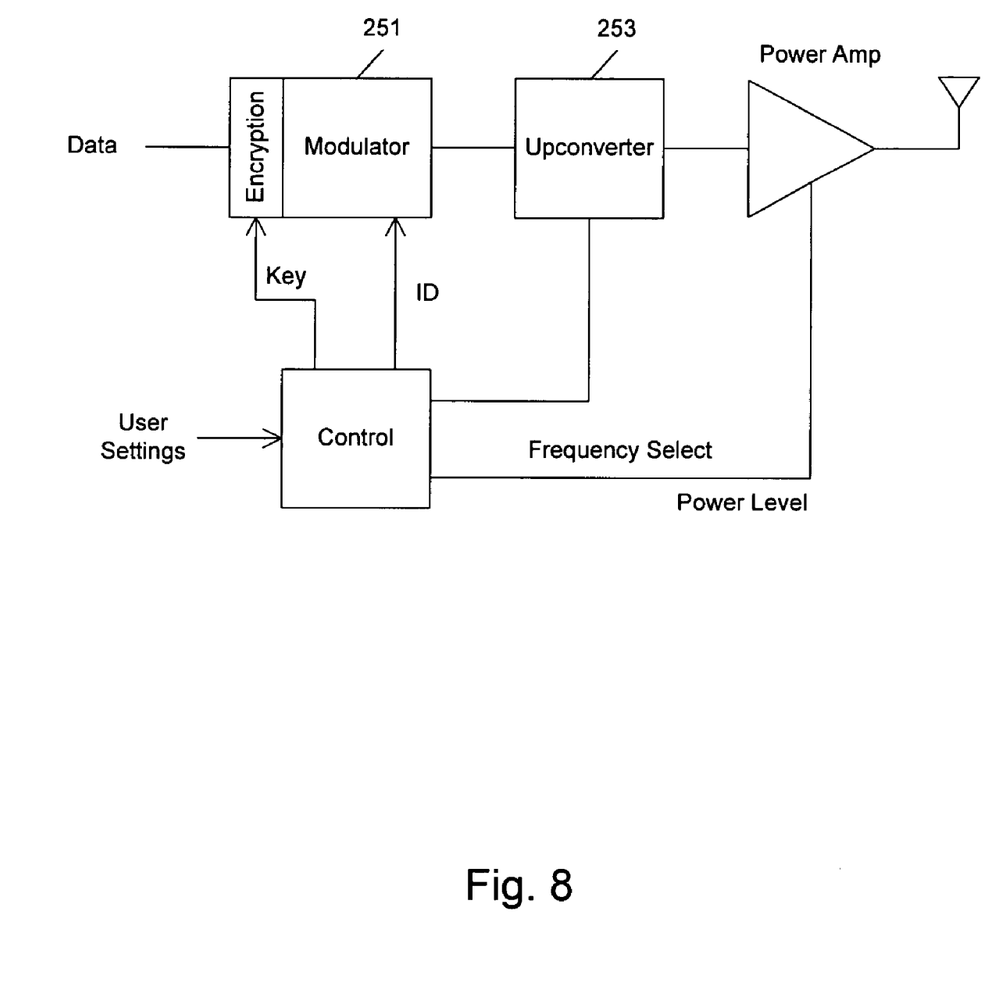
FIG. 8 is block diagram of a modulator and transmitter.

FIG. 8 shows details of a modulator and transmitter suitable for use with the invention. Digital data modulation and transmitting is well known. The video data is preferably transmitted as digital data. Encryption may be performed on the data. Modulator 251 maps the digital data to analog symbols suitable for the modulation type used. Up converter 253 translates the symbol signal to an RF frequency. To enable operation of several units within communication range of each other, the RF frequency is selectable by the user setting under control of control unit 252. The frequency choices can be within any available or authorized band, preferably an unlicensed band commonly used for short-range low power links.

Power level of the transmitter can be adjustable to avoid interference with other links. Power amplifier 254 has a power level setting controlled by control unit 252. Power amplifier 254 drives antenna 210 to transmit the wireless link signal.

In operation, a user can adjust the transmitted power to achieve robust transmission to the receiving device. It is desirable to use the minimum level of power required in order to reduce interference with other similar links. An example of operation of the power level setting function has the initial power set to lowest power level and commands initiated by remote control increase the power level in predetermined increments until the picture is viewable. The control logic can increase the power level an additional amount to provide margin and assure a viewable picture if minor adjustments are made to the position of the transmitting or receiving terminal.

The data formatting and modulation techniques used to transmit the encoded video data can be selected from among the many techniques well known in the art for transmitting and receiving digital data. Examples of modulation techniques include on-off keying (OOK), amplitude modulation (AM), amplitude shift keying (ASK), frequency modulation (FM), frequency shift keying (FSK), Gaussian minimum shift keying (GMSK), binary phase shift keying (BPSK), quadrature phase shift keying (QPSK), quadrature partial response (QPR), quadrature amplitude modulation (QAM), vestigial sideband (VSB), orthogonal frequency division multiplex (OFDM), code division multiple access (CDMA), ultra-wide band (UWB), and numerous variations of these modulation types.

The sending unit digital modulator and receiving unit demodulator incorporate error correction coding and decoding, respectively to insure error free communication over the wireless link. Compressed video data is particularly sensitive to data errors. If an error occurs in a critical part of the data stream, small regions of the screen may be affected or an entire frame may be affected. Error correction coding can be used to insure that error free communication occurs. Error correction coding and decoding is well known in the art. Examples of error correction coding techniques include Reed-Solomon coding (RS), convolutional coding, trellis coding, turbo coding, and concatenated combinations of these coding techniques such as RS followed by convolution coding. Data interleaving can be used to increase the effectiveness of error correction coding. Error detection coding can be employed using check sums or cyclic redundancy codes (CRC).

Figure 9:
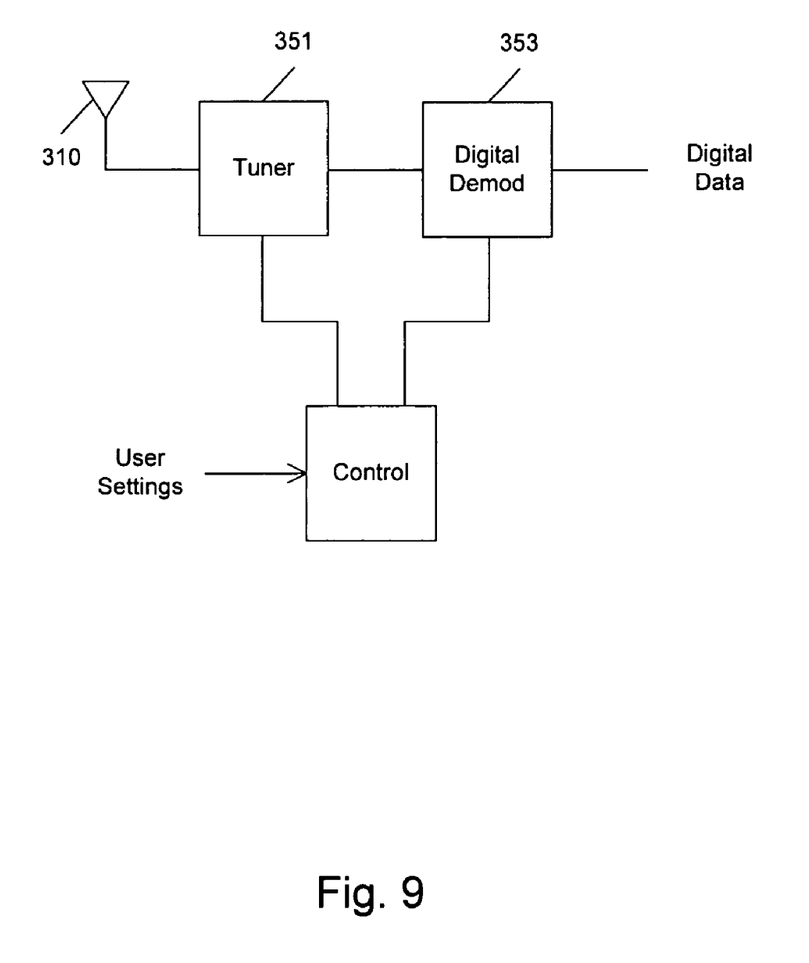
FIG. 9 is a block diagram of a receiver.

FIG. 9 shows details of a receiver for use in the present invention. Tuner 351 preselects, amplifies, and down converts the received signal. Digital demodulator 353 converts the signal to digital data suitable for decoding by the video decoder. Control 352 sets tuner frequency and digital demodulator parameters.

The wireless extension can also be used in conjunction with direct broadcast satellite (DBS) television service. Analog over-the-air television signals can be selected and combined with digital satellite channels and transmitted over the wireless link to a receiving unit. The wireless sending unit can be incorporated into a DBS set top box.

What is claimed is:

1. A wireless extension for transmitting analog and digital television signals from one location to another comprising:
    a sending unit comprising:
        a remote control interface for receiving a channel selection command;
        at least one tuner for receiving both analog and digital television signals responsive to the remote control interface with an RF input and a tuner output;
        a digital demodulator for receiving the tuner output and producing a digital stream containing MPEG encoded program information;
        an MPEG demultiplexer for receiving the MPEG information from the digital demodulator and selecting at least one MPEG program to produce a first MPEG stream;
        an MPEG encoder receiving the tuner output and producing a second MPEG stream;
        a selector for selecting between the first MPEG stream and the second MPEG stream, wherein an active MPEG stream is selected;
        a digital lock detector in the digital demodulator for detecting a digital signal lock condition;
        an analog lock detector in the MPEG encoder for detecting an analog signal lock condition;
        control logic circuitry responsive to the digital lock detector and the analog lock detector with an output to the selector to select an active MPEG stream from the stream indicating a lock condition; and
        a modulator and transmitter for producing an RF signal to transmit the selected MPEG stream;
    a receiving unit comprising:
        a receiver for receiving the RF signal; and
        an MPEG demultiplexer/decoder for demultiplexing the desired program and converting the MPEG program to a signal suitable for driving a television receiver.

2. The wireless extension of claim 1 further comprising:
in the sending unit a means for encryption of the selected MPEG program; and
in the receiving unit a means for decryption of the received signal.

3. The wireless extension of claim 2 further comprising:
a public key exchange wherein a public key is transmitted from the receiving unit to the sending unit.

4. The wireless extension of claim 1 further comprising:
in the receiving unit a conditional access unit that receives information to enable decoding of the MPEG program.

5. The wireless extension of claim 1 further comprising:
in the sending unit a programmable transmit power level circuit responsive to power level commands from the remote control.

* * * * *